(12) United States Patent
Vasseur

(10) Patent No.: US 7,326,745 B2
(45) Date of Patent: Feb. 5, 2008

(54) TREAD FOR A TIRE

(75) Inventor: Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 23 days.

(21) Appl. No.: 10/912,277

(22) Filed: Aug. 5, 2004

(65) Prior Publication Data

US 2005/0043448 A1    Feb. 24, 2005

Related U.S. Application Data

(63) Continuation of application No. PCT/EP03/01126, filed on Feb. 5, 2003.

(30) Foreign Application Priority Data

Feb. 7, 2002    (FR) ................... 02 01659

(51) Int. Cl.
*C08K 3/04*    (2006.01)
*C08K 3/26*    (2006.01)
*C08K 5/3445*    (2006.01)

(52) U.S. Cl. ............... 524/105; 524/424; 524/441; 524/493; 156/96

(58) Field of Classification Search ................ 524/105, 524/424, 441, 493; 156/96
See application file for complete search history.

(56) References Cited

U.S. PATENT DOCUMENTS

| 6,329,457 B1 | 12/2001 | Datta et al. | 524/270 |
| 6,420,448 B1 | 7/2002 | Penot | 524/270 |
| 6,506,849 B1* | 1/2003 | Hojo et al. | 525/332.7 |
| 2001/0034389 A1* | 10/2001 | Vasseur | 524/137 |
| 2002/0077423 A1 | 6/2002 | Sugimoto et al. | 525/178 |

FOREIGN PATENT DOCUMENTS

| WO | WO 99/06480 | 2/1999 |
| WO | WO 02/10269 A2 | 2/2002 |

* cited by examiner

*Primary Examiner*—Kriellion A Sanders
(74) *Attorney, Agent, or Firm*—Cohen Pontani Lieberman & Pavane LLP

(57) ABSTRACT

A tire tread comprising a rubber composition based on at least:
(i) a diene elastomer;
(ii) more than 60 phr of a reinforcing inorganic filler;
(iii) between 2 and 15 phr of a coupling agent; and
(iv) between 4 and 12 phr of a bismaleimide compound.

This tread has, after mechanical running-in of the tire comprising it, a rigidity gradient which increases radially from the surface towards the inside of the tread, imparting to the tire an improved compromise of grip/behavior properties. Use of such a tread for the manufacturing or recapping of tires. Tires comprising such a tread.

22 Claims, No Drawings

TREAD FOR A TIRE

CROSS REFERENCES TO RELATED APPLICATIONS

This application is a continuation of PCT/EPO3/01126 filed on 5 Feb. 2003, and published in the French language on 14 Aug. 2004, as WO2003/066722. The present application also claims priority to French national filing of 7 Feb. 2002, serial number 02/01659.

FIELD OF THE INVENTION

The present invention relates to treads for tires and to rubber compositions used for the manufacture of such treads.

BACKGROUND OF THE INVENTION

It relates more particularly to treads for tires having a low rolling resistance, reinforced majoritarily by inorganic fillers, these treads being intended in particular for tires fitted on vehicles such as motorcycles, passenger cars, vans or heavy vehicles.

Since fuel economies and the need to protect the environment have become priorities, it has proved necessary to produce tires having both reduced rolling resistance and high wear resistance. This has been made possible due in particular to the discovery of new rubber compositions reinforced with specific inorganic fillers referred to as "reinforcing" fillers, which are capable of rivalling conventional carbon black from the reinforcing point of view, and furthermore offering these compositions a low hysteresis, which is synonymous with lesser rolling resistance for the tire treads comprising them. Such compositions based on reinforcing inorganic fillers of the siliceous or aluminous type, have for example been described in patents or patent applications EP-A-0 501 227, EP-A-0 735 088, EP-A-0 810 258, EP-A-0 881 252, WO99/02590, WO99/02601, WO99/02602, WO99/28376, WO00/05300, WO00/05301, WO01/96442, WO02/30939, WO02/31041 and WO02/083782.

However, ideally, a tire tread must meet other technical demands, some of which are contradictory, such as having in particular very good grip both on dry ground and on wet, snow-covered or icy ground, while offering the tire a very good level of road behavior ("handling") on an automobile, in particular high drift thrust (or "cornering").

To improve the road behavior, it is known that greater rigidity of the tread is desirable, this stiffening possibly being obtained for example by increasing the amount of reinforcing filler or by incorporating certain reinforcing resins into the rubber compositions constituting these treads.

However, such stiffening of the tread, at the very least for its surface part which is in contact with the ground during rolling of the tire is known to impair, most frequently in crippling manner, the properties of grip on wet, snow-covered or icy ground.

This is why, in order to meet these two contradictory demands, namely road behaviour and grip, it has essentially been proposed hitherto to use composite treads (i.e. hybrid treads), formed by two radially superposed layers ("cap-base structure") of different rigidities, formed of two rubber compositions of different formulations: the radially outer layer, in contact with the road, is formed of the more flexible composition, in order to meet the grip requirements; the radially inner layer is formed of the more rigid composition, in order to meet the road behavior requirements.

Such a solution however has numerous disadvantages:
first of all, the manufacturing of a composite tread is by definition more complex and therefore more costly than that of a conventional tread, and requires in particular the use of complex coextrusion machines;
during manufacturing, after cutting out the tread to the correct dimensions once it has emerged from the extruder, it is furthermore necessary to manage discarding of material of different natures, which further substantially increases the production costs;
finally, and this is not the least of the disadvantages, once the radially outer (flexible) part of the tread has become worn, it is the initially inner part of the tread which comes into contact with the road: then, of course, one has the disadvantages of an excessively rigid tread, with unsatisfactory performance from the point of view of the technical compromise initially intended.

SUMMARY OF THE INVENTION

Now, the Applicant has discovered during his research that a specific rubber composition, based on a high amount of reinforcing inorganic filler and a bismaleimide compound, makes it possible, owing to an unexpected "auto-accommodation" phenomenon, to obtain a tread having a true rigidity gradient, radially increasing from the surface towards the inside of the tread. This rigidity gradient is obtained not only simply and economically, but also durably, thus making it possible to maintain the compromise between grip and road behavior of the tires at a very high level, throughout the life of the latter.

Consequently, a first subject of the invention relates to a tire tread comprising a rubber composition based on at least (phr=parts by weight per hundred parts of elastomer):
  (i) a diene elastomer;
  (ii) more than 60 phr of a reinforcing inorganic filler;
  (iii) between 2 and 15 phr of a coupling agent;
  (iv) between 4 and 12 phr of a bismaleimide compound.

Bismaleimide compounds are well-known to the person skilled in the art for their ability to form, by polymerization, a three-dimensional reinforcing resin lattice (hereafter "bismaleimide lattice") upon a curing operation. They have been used in rubber compositions, in particular for tires, for applications as varied as adhesion, reinforcement, tear resistance and vulcanization. For a detailed description of these compounds, the processes for obtaining them or their various applications, in particular in tire rubber applications, reference may be made to the following documents: FR-A-1 257 913, FR-A-2 611 209, EP-A-0 345 825, EP-A-0 410 152, EP-A-0 475 222, EP-A-0 536 701, EP-A-0 564 966, EP-A-1 083 199, US-A-2,289,504, U.S. Pat. No. 3,219,091, U.S. Pat. No. 4,803,250, U.S. Pat. No. 4,818,601, U.S. Pat. No. 5,109,055, U.S. Pat. No. 5,153,248, U.S. Pat. No. 5,262,488, U.S. Pat. No. 5,300,585, U.S. Pat. No. 5,985,963, Japanese applications published under the Nos. JP1989/62338, JP1989/278543 and JP1991/54235.

However, as far as the Applicants is aware, no document of the prior art describes the use in a tire tread, in the proportions set forth here (between 4 and 12 phr), of a bismaleimide compound in combination with such a high amount (more than 60 phr, preferably more than 70 phr) of a reinforcing inorganic filler such as silica. The knowledge of the person skilled in the art, acquired essentially in the field of rubber compositions filled majoritarily with carbon black, on the contrary pointed him away from such a use, owing to a stiffening ability, for this type of bismaleimide compounds, which is deemed a great disadvantage with regard in particular to the grip properties mentioned above. To illustrate this prejudice, reference will be made for example to the aforementioned application EP-A-1 083 199, the examples of embodiment of which are limited to amounts of bismaleimide compounds within a range from 1 to 4 phr, whatever the type of reinforcing filler used.

The subject of the invention is also the use of such a tread for the manufacturing of new tires or the recapping of worn tires. The tread according to the invention is particularly suited to tires intended to be fitted on passenger vehicles, 4×4 vehicles (having 4 driving wheels), motorcycles, vans and heavy vehicles (i.e. subway trains, buses, road transport machinery, off-road vehicles).

The subject of the invention is also these tires themselves when they comprise a tread according to the invention. It relates in particular to tires of "winter" type intended for snow-covered or icy roads.

Another subject of the invention is a process for preparing a tire tread, having, after curing and mechanical running-in of the tire comprising it, a rigidity gradient which increases radially from the surface towards the inside of the tread, this process being characterized in that it comprises the following steps:

incorporating in a diene elastomer, in a mixer, during a first step referred to as "non-productive":
more than 60 phr of a reinforcing inorganic filler;
between 2 and 15 phr of a coupling agent; and
between 4 and 12 phr of a bismaleimide compound,
thermomechanically kneading the entire mixture, in one or more stages, until a maximum temperature of between 130° C. and 200° C. is reached;
cooling the entire mixture to a temperature of less than 100° C.;
then incorporating, during a second step referred to as "productive":
a vulcanization system;
kneading the entire mixture until a maximum temperature less than 120° C. is reached; and
extruding or calendering the rubber composition thus obtained, in the form of a tire tread.

DETAILED DESCRIPTION OF THE INVENTION

The invention and its advantages will be readily understood in the light of the description and the examples which follow.

I. Measurements and Tests Used

The treads and rubber compositions constituting these treads are characterized or tested as indicated hereafter.

I-1. Shore A Hardness

The Shore A hardness of the compositions after curing is assessed in accordance with ASTM Standard D 2240-86.

I-2. Tensile Tests

The tensile tests make it possible to determine the elasticity stresses and the properties at break, after curing. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after a cycle of accommodation to the amount of extension provided for the measurement itself).

The nominal secant modulus is also measured at 10% elongation, after an accommodation of 15% (i.e. an extension to 15% followed by relaxation to 0%) instead of 10% as previously for the modulus ME10. This so-called "accommodated" modulus is referred to as $ME10_{Ac}$. All these tensile measurements are effected under normal conditions of temperature and humidity (23±2° C. and 50±5% relative humidity, in accordance with French standard NF T 40-101 of December 1979).

I-3. Mechanical Accommodation

"Mechanical accommodation" is understood to mean simple running-in of the tire by means of which its tread is placed in contact with the ground during rolling, that is to say in working conditions, for several tens of seconds or several minutes at the most. This running-in operation may be carried out on an automatic rolling machine or directly on an automobile; it may be effected in various ways, for example by simply rolling in a straight line of several tens or hundreds of meters, by longitudinal braking or alternatively by drifting of the tire (bends), the important thing being to start making the tread "work" under normal conditions of use.

By way of example, such mechanical accommodation may be achieved by what is called "standard" running-in consisting of simple running in a straight line over a length of 400 meters at a speed of 60 km/h, on a given automobile, without drifting or cambering imposed on the tire, followed by moderate longitudinal braking (braking distance from 30 to 40 meters) to stop the vehicle. This standard running-in is furthermore effected under normal conditions of pressure (those recommended by the manufacturer of the vehicle used) and load (1 person only on board the vehicle).

II. Detailed Description of Embodiments

The treads according to the invention are formed, at least in part, of a rubber composition based on at least: (i) at least one diene elastomer; (ii) a minimum quantity (more than 60 phr) of at least one inorganic filler as reinforcing filler; (iii) at least one coupling agent (between 2 and 15 phr) providing the bond between the reinforcing inorganic filler and this diene elastomer; and (iv) at least one bismaleimide compound (between 4 and 12 phr).

Of course, the expression composition "based on" is to be understood to mean a composition comprising the mix and/or the product of reaction in situ of the various constituents used, some of these base constituents (for example the reinforcing inorganic filler, the coupling agent, the bismaleimide compound) being liable to, or intended to, react together, at least in part, during the different phases of manufacturing of the treads, in particular during the vulcanization or curing thereof.

In the present description, unless expressly indicated otherwise, all the percentages (%) indicated are mass %.

II-1. Diene Elastomer

"Diene" elastomer or rubber is understood to mean, generally, an elastomer resulting at least in part (i.e. a homopolymer or a copolymer) from diene monomers (monomers bearing two double carbon-carbon bonds, whether conjugated or not). "Essentially unsaturated" diene elastomer is understood here to mean a diene elastomer resulting at least in part from conjugated diene monomers, having a content of members or units of diene origin (conjugated dienes) which is greater than 15% (mol %). Thus, for example, diene elastomers such as butyl rubbers or copolymers of dienes and of alpha-olefins of the EPDM type do not fall within this definition, and may on the contrary be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is used first and foremost with highly unsaturated diene elastomers, in particular with:

(a)—any homopolymer obtained by polymerization of a conjugated diene monomer having 4 to 12 carbon atoms;
(b)—any copolymer obtained by copolymerization of one or more conjugated dienes with each other or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$)alkyl-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent.

Preferred are polybutadienes, and in particular those having a content of 1,2-units of between 4% and 80%, or those having a content of cis-1,4 of more than 80%, polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature ("Tg"—measured in accordance with ASTM Standard D3418-82) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, particularly preferably, the diene elastomer of the composition used in the tread according to the invention is selected from the group of highly unsaturated diene elastomers constituted by polybutadienes (BR), synthetic polyisoprenes (IR), natural rubber (NR), butadiene copolymers, isoprene copolymers and mixtures of these elastomers. Such copolymers are more preferably selected from the group which consists of butadiene/styrene copolymers (SBR), butadiene/isoprene copolymers (BIR), isoprene/styrene copolymers (SIR), isoprene/butadiene/styrene copolymers (SBIR) and mixtures of such copolymers.

The tread according to the invention is preferably intended for a passenger-car tire. In such a case, the diene elastomer is preferably an SBR copolymer, in particular an SBR prepared in solution, preferably used in a mixture with a polybutadiene; more preferably, the SBR has a content of styrene of between 20% and 30% by weight, a content of vinyl bonds of the butadiene fraction of between 15% and 65%, a content of trans-1,4 bonds of between 15% and 75% and a Tg of between −20° C. and −55° C., and the polybutadiene has more than 90% cis-1,4 bonds.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

II-2. Reinforcing Inorganic Filler

"Reinforcing inorganic filler" is to be understood in known manner to mean any inorganic or mineral filler, whatever its colour and its origin (natural or synthetic), also referred to as "white" filler or sometimes "clear" filler, in contrast to carbon black, which is capable, on its own, without any other means than an intermediate coupling agent, of reinforcing a rubber composition intended for the manufacture of a tire tread, in other words which is capable of replacing a conventional tire-grade carbon black (for treads) in its reinforcement function.

Preferably, the reinforcing inorganic filler is a filler of the siliceous (for example silica) or aluminous (for example alumina) type, or a mixture of these two types of fillers.

The silica ($SiO_2$) used may be any reinforcing silica known to the person skilled in the art, in particular any precipitated or fumed silica having a BET surface area and a CTAB specific surface area both of which are less than 450 $m^2/g$, preferably from 30 to 400 $m^2/g$. Highly dispersible precipitated silicas (referred to as "HDS") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. As examples of such preferred HD silicas, mention may be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber, and treated precipitated silicas such as, for example, the aluminium-"doped" silicas described in the aforementioned application EP-A-0 735 088.

The reinforcing alumina ($Al_2O_3$) preferably used is a highly dispersible alumina having a BET surface area from 30 to 400 $m^2/g$, more preferably between 60 and 250 $m^2/g$, an average particle size at most equal to 500 nm, more preferably at most equal to 200 nm, as described in the aforementioned application EP-A-0 810 258. Examples of such reinforcing aluminas are in particular the aluminas "Baikalox", "A125" or "CR125" (from Baïkowski), "APA-100RDX" (from Condea), "Aluminoxid C" (from Degussa) or "AKP-G015" (Sumitomo Chemicals). The invention can also be implemented by using as reinforcing inorganic filler the specific aluminium (oxide-)hydroxides such as described in WO99/28376.

The physical state in which the reinforcing inorganic filler may be present is immaterial, whether it be in the form of a powder, microbeads, granules, pellets, balls or any other appropriate densified form.

Of course, "reinforcing inorganic filler" is also understood to mean mixtures of different reinforcing inorganic fillers, in particular of highly dispersible siliceous and/or aluminous fillers such as described above.

When the treads of the invention are intended for tires of low rolling resistance, the reinforcing inorganic filler used, in particular if it is silica, preferably has a BET surface area of between 60 and 250 $m^2/g$, more preferably between 80 and 230 $m^2/g$.

The inorganic filler used as reinforcing filler must be present in a high amount, greater than 60 phr, preferably greater than 70 phr, which is one of the essential characteriztics of the invention, this reinforcing inorganic filler possibly constituting all or the majority of the total reinforcing filler, in this latter case associated for example with a minority quantity of carbon black (preferably less than 20 phr, more preferably less than 15 phr).

The person skilled in the art will readily understand that the optimum amount will differ according to the nature of the reinforcing inorganic filler used and the type of tire in question, for example tire for motorcycles, for passenger vehicles or alternatively for utility vehicles such as vans or heavy vehicles. Preferably, the amount of reinforcing inorganic filler is between 70 and 120 phr, more preferably still within a range from 80 to 110 phr approximately, for example from 80 to 105 phr in the specific case of treads for passenger-vehicle tires.

Preferably, in the tread according to the invention, the reinforcing inorganic filler constitutes more than 80% by weight of the total reinforcing filler, more preferably more than 90% by weight (or even all) of this total reinforcing filler. However, without significantly affecting the technical effect desired, a small quantity of carbon black, preferably less than 20%, more preferably still less than 10% by weight relative to the quantity of total reinforcing filler, may be used.

The carbon black, if used, is preferably present in an amount of between 2 and 15 phr, more preferably between 4 and 12 phr. It can be used in particular as a simple black pigmentation agent, or alternatively to protect the tread from different sources of atmospheric aging such as ozone, oxidation or UV radiation. On the other hand, it is known that certain rubber-making additives, in particular certain coupling agents, are available in a form supported by carbon black, the use of such additives therefore involving the incorporation, in a small proportion, of carbon black. Suitable carbon blacks are any carbon blacks, in particular the blacks of the type HAF, ISAF and SAF, which are conventionally used in tires, and particularly in treads for these tires; as non-limitative examples of such blacks, mention may be made of the blacks N115, N134, N234, N339, N347 and N375.

In the present specification, the BET specific surface area is determined in known manner by adsorption of gas using the method of Brunauer-Emmett-Teller described in "The *Journal of the American Chemical Society*" Vol. 60, page 309, February 1938, more precisely in accordance with French Standard NF ISO 9277 of December 1996 [multi-point volumetric method (5 points)—gas: nitrogen—degassing: 1 hour at 160° C.—range of relative pressure p/po: 0.05 to 0.17]. The CTAB specific surface area is the external surface area determined in accordance with French Standard NF T 45-007 of November 1987 (method B).

Finally, as filler equivalent to such a reinforcing inorganic filler, there could be used a reinforcing filler of organic type, in particular a carbon black, coated at least in part with an inorganic layer (for example, a layer of silica), which for its part requires the use of a coupling agent to provide the connection to the elastomer.

II-3. Coupling Agent

In known manner, in the presence of a reinforcing inorganic filler, it is necessary to use a coupling agent or bonding agent, the function of which is to provide a sufficient chemical and/or physical connection between the inorganic filler (surface of its particles) and the diene elastomer.

Such a coupling agent, which is consequently at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulphur atom; and T represents a divalent group making it possible to link Y and X.

The coupling agents must particularly not be confused with simple agents for coating the inorganic filler which, in known manner, may comprise the function Y which is active with respect to the inorganic filler but are devoid of the function X which is active with respect to the elastomer.

(Silica/diene elastomer) coupling agents, of variable effectiveness, have been described in a very large number of documents and are well-known to the person skilled in the art. Any coupling agent likely to ensure, in the diene rubber compositions usable for the manufacturing of tire treads, the effective bonding between a reinforcing inorganic filler such as silica and a diene elastomer, in particular organosilanes or polyfunctional polyorganosiloxanes bearing the functions X and Y, may be used.

In particular polysulphurized silanes, which are referred to as "symmetrical" or "asymmetrical" depending on their specific structure, are used, such as those described for example in the patents or patent applications FR 2 149 339, FR 2 206 330, U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, EP 1 043 357 or WO02/083782.

Particularly suitable for implementing the invention, without the definition below being limiting, are what are called "symmetrical" polysulphurized silanes which satisfy the following general formula (I):

$$Z\text{-}A\text{-}S_n\text{-}A\text{-}Z, \quad (I)$$

in which:
n is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);
Z corresponds to one of the formulae below:

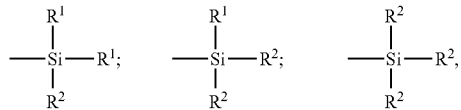

in which:
the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl); and
the radicals $R^2$, which may or may not be substituted, and may be identical or different, represent a $C_1$-$C_{18}$ alkoxyl group or a $C_5$-$C_{18}$ cycloalkoxyl group (preferably a group selected from among $C_1$-$C_8$ alkoxyls and $C_5$-$C_8$ cycloalkoxyls, more preferably still a group selected from among $C_1$-$C_4$ alkoxyls, in particular methoxyl and/or ethoxyl).

In the case of a mixture of polysulphurized alkoxysilanes in accordance with Formula (I) above, in particular conventional, commercially available, mixtures, the average value of the "n"s is a fractional number, preferably between 2 and 5, more preferably close to 4. However, the invention may also be implemented advantageously for example with disulphurized alkoxysilanes (n=2).

As examples of polysulphurized silanes, mention will be made more particularly of the polysulphides (in particular disulphides, trisulphides or tetrasulphides) of bis-(($C_1$-$C_4$)alkoxyl-($C_1$-$C_4$)alkylsilyl($C_1$-$C_4$)alkyl), such as for example the polysulphides of bis(3-trimethoxysilylpropyl) or of bis (3-triethoxysilylpropyl). Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used.

TESPD is sold, for example, by Degussa under the name Si75 (in the form of a mixture of disulphide—75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

Mention will also be made as advantageous coupling agent of the polysulphides (in particular disulphides, trisulphides or tetrasulphides) of bis-(mono($C_1$-$C_4$)alkoxyl-di($C_1$-$C_4$)alkylsilylpropyl), more particularly bis-monoethoxydimethylsilylpropyl tetrasulphide as described in the aforementioned application WO02/083782.

As examples of coupling agents other than the aforementioned polysulphurized alkoxysilanes, mention will be made in particular of the bifunctional polyorganosiloxanes such as described for example in the aforementioned applications WO99/02602 or WO01/96442, or alternatively the hydroxysilane polysulphides such as described in the aforementioned applications WO02/30939 and WO02/31041.

In the treads according to the invention, the content of coupling agent is preferably between 4 and 12 phr, more preferably between 3 and 8 phr. However, it is generally desirable to use as little as possible thereof. Relative to the weight of reinforcing inorganic filler, the amount of coupling agent typically represents between 0.5 and 15% by weight relative to the quantity of reinforcing inorganic filler. In the case for example of tire treads for passenger vehicles, the coupling agent is used in a preferred amount of less than 12%, or even less than 10% by weight relative to this quantity of reinforcing inorganic filler.

The coupling agent could be grafted beforehand (via the "X" function) on to the diene elastomer of the composition of the invention, the elastomer thus functionalized or "precoupled" then comprising the free "Y" function for the reinforcing inorganic filler. The coupling agent could also be grafted beforehand (via the "Y" function) on to the reinforcing inorganic filler, the filler thus "precoupled" then being able to be bonded to the diene elastomer by means of the free "X" function. However, it is preferred, in particular for reasons of better processing of the compositions in the uncured state, to use the coupling agent either grafted onto the reinforcing inorganic filler, or in the free (i.e. non-grafted) state.

There may possibly be associated with the coupling agent an appropriate "coupling activator", that is to say, a body (single compound or association of compounds) which, when mixed with this coupling agent, increases the effectiveness of the latter. Coupling activators for polysulphurized alkoxysilanes have for example been described in the aforementioned international applications WO00/05300 and WO00/05301, consisting of the association of a substituted guanidine, in particular N,N'-diphenylguanidine (abbreviated to "DPG"), with an enamine or a zinc dithiophosphate. The presence of these coupling activators will make it possible, for example, to keep the amount of coupling agent at a preferred level of less than 10%, or even less than 8% by weight relative to the quantity of reinforcing inorganic filler, or alternatively to reduce the amount of reinforcing inorganic filler owing to the improved coupling with the diene elastomer.

II-4. Bismaleimide Compound

The rubber compositions of the treads of the invention contain at least, in an amount of between 4 and 12 phr, a bismaleimide compound intended to form in situ, after curing (vulcanization) of the tread, a three-dimensional resin lattice which is superposed and interpenetrates with the (inorganic filler/elastomer) lattice on one hand, and with the (elastomer/sulphur) lattice on the other hand (if the crosslinking agent is sulphur).

The invention is preferably implemented with bismaleimide compounds of the general formula:

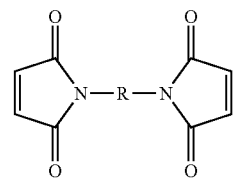

in which R is an aromatic or aliphatic, cyclic or acyclic hydrocarbon radical, whether substituted or non-substituted, such a radical possibly comprising a heteroatom selected from among O, N and S; this radical R preferably comprises from 2 to 24 carbon atoms.

Such a definition includes for example N,N'-(ethylene)-bismaleimides, N,N'-(hexamethylene)-bismaleimides, N,N'-(dodecamethylene)-bismaleimides, N,N'-(2,2,4-trimethyl-hexamethylene)-bismaleimides, N,N'-(oxy-dipropylene)-bismaleimides, N,N'-(amino-di-propylene)-bismaleimides, N,N'-(1,3-cyclohexylene)-bismaleimides, N,N'-(1,4-cyclohexylene)-bismaleimides, N,N'-(methylene-1,4-dicyclohexylene)-bismaleimides, N,N'-(3,3'-dimethyl-4,4'-biphenylene)-bismaleimides, N,N'-(m-phenylene)-bismaleimides, N,N'-(p-phenylene)-bismaleimides, N,N'-(o-phenylene)-bismaleimides, N,N'-(1,3-naphthylene)-bismaleimides, N,N'-(1,4-naphthylene)-bismaleimides, N,N'-(1,5-naphthylene)-bismaleimides, N,N'-(4,6-dimethyl-1,3-phenylene)-bismaleimides, N,N'-(2,4-toluylene)-bismaleimides, N,N'-(2,6-toluylene)-bismaleimides, N,N'-(methylene-di-p-phenylene)-bismaleimides, N,N'-(oxy-dipropylene)-bismaleimides, N,N'-(oxy-di-p-phenylene)-bismaleimides, N,N'-(4,4'-di-phenylmethane)-bismaleimides, N,N'-(4,4'-diphenylether)-bismaleimides, N,N'-(4,4'-diphenylsulphone)-bismaleimides and N,N'-(4,4'-diphenyldithio)-bismaleimides.

"Bismaleimide compound" is also understood to mean poly-bismaleimide compounds (bismaleimide polymers or oligomers).

The bismaleimides preferably selected are N,N'-(m-phenylene)-bismaleimide (abbreviated to "MPBM") and N,N'-(4,4'-diphenylmethane)-bismaleimide (abbreviated to "DPBM").

The quantity of bismaleimide compound may vary as a function of the nature of the diene elastomer used and the quantity of reinforcing inorganic filler, within a range of between 4 and 12 phr. Below the minimum indicated, the technical effect desired is not obtained, whereas beyond the maximum indicated there is excessive stiffening, excessive compromising of the hysteresis and a significant increase in cost. A quantity within a range from 5 to 10 phr has proved well suited, in particular in the case of treads for passenger-vehicle tires.

A radical initiator (free-radical generator), for example an organic peroxide, could possibly be added, in a very small quantity, to the rubber compositions to activate the formation of the bismaleimide resin lattice, during their curing.

II-5. Various Additives

Of course, the rubber compositions of the treads according to the invention also comprise all or part of the additives usually used in sulphur-cross-linkable diene rubber compositions intended for the manufacturing of treads, such as, for example, plasticizers, pigments, protective agents of the type antioxidants, antiozonants, anti-fatigue agents, other reinforcing resins, a cross-linking system based either on sulphur or on sulphur and/or peroxide donors, vulcanization accelerators, vulcanization activators, extender oils, etc. There may also be associated with the reinforcing inorganic filler, if necessary, a conventional non-reinforcing white filler, such as for example particles of clay, bentonite, talc, chalk, kaolin or titanium oxides.

The rubber compositions of the treads of the invention may also contain, in addition to the coupling agents, agents for coating the reinforcing inorganic filler (comprising for example the single function Y), or more generally processing aids liable, in known manner, owing to an improvement in the dispersion of the inorganic filler in the rubber matrix and to a reduction in the viscosity of the compositions, to improve their processability in the uncured state, these agents, used in a preferred amount of between 0.5 and 3 phr, being, for example, alkylalkoxysilanes, (in particular alkyltriethoxysilanes), polyols, polyethers (for example polyethylene glycols), primary, secondary or tertiary amines, hydroxylated or hydrolyzable polyorganosiloxanes, for example $\alpha,\omega$-dihydroxypolyorganosiloxanes (in particular $\alpha,\omega$-dihydroxy-polydimethylsiloxanes).

II-6. Manufacturing of the Treads

The rubber compositions of the treads of the invention are manufactured in suitable mixers, using two successive preparation phases in accordance with a general process well-known to the person skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanization system is incorporated.

The process according to the invention, for preparing a tire tread having, after curing and mechanical running-in of the tire for which it is intended, a rigidity gradient radially increasing from the surface towards the inside of the tread, comprises the following steps:

incorporating in a diene elastomer, in a mixer, during a first step referred to as "non-productive":
more than 60 phr of a reinforcing inorganic filler;
between 2 and 15 phr of a coupling agent; and
between 4 and 12 phr of a bismaleimide compound;
thermomechanically kneading the entire mixture, in one or more stages, until a maximum temperature of between 130° C. and 200° C. is reached;
cooling the entire mixture to a temperature of less than 100° C.;
then incorporating, during a second step referred to as "productive":
a vulcanization system;
kneading the entire mixture until a maximum temperature less than 120° C. is reached; and
extruding or calendering the rubber composition thus obtained, in the form of a tire tread.

According to a preferred embodiment, all the base constituents of the compositions of the treads according to the invention, with the exception of the vulcanization system and any radical initiator, namely the reinforcing inorganic filler, the coupling agent and the bismaleimide compound, are incorporated intimately by kneading in the diene elastomer during the first, so-called non-productive, phase, that is to say that at least these different base constituents are introduced into the mixer and are kneaded thermomechanically, in one or more stages, until the maximum temperature of between 130° C. and 200° C., preferably between 145° C. and 185° C., is reached. However, all or part of the bismaleimide compound could also be incorporated during the productive phase.

By way of example, the first (non-productive) phase is effected in a single thermomechanical step during which all the necessary constituents, any complementary coating agents or processing agents and various other additives, with the exception of the vulcanization system, are introduced into a suitable mixer, such as a conventional internal mixer. A second stage of thermomechanical working could possibly be added, in this internal mixer, for example after an intermediate cooling stage (preferably to a temperature of less than 100° C.), with the aim of making the compositions undergo complementary heat treatment, in particular in order to improve the dispersion, in the elastomeric matrix, of the reinforcing inorganic filler, the coupling agent and the bismaleimide compound.

After cooling the mixture thus obtained at the end of the first, non-productive, phase, the vulcanization system is then incorporated at low temperature, in an external mixer such as an open mill. The entire mixture is then mixed (productive phase) for several minutes, for example between 5 and 15 minutes.

The vulcanization system proper is preferably based on sulphur and a primary vulcanization accelerator, in particular an accelerator of the sulphenamide type. To this vulcanization system there are added, incorporated during the first, non-productive, phase and/or during the productive phase, various known secondary accelerators or vulcanization activators such as zinc oxide, stearic acid, guanidine derivatives (in particular diphenylguanidine). The amount of sulphur is preferably between 0.5 and 3.0 phr, and the amount of the primary accelerator is preferably between 0.5 and 5.0 phr.

The final composition thus obtained is then calendered, for example in the form of a film or a sheet, in particular for characterization in the laboratory, or alternatively extruded in the form of a rubber profiled element usable directly as a tire tread.

The vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question, and the size of the tire in question.

To summarize, in the process according to the invention, in accordance with all the particulars given previously, preferably at least one, more preferably all, of the following characteriztics are satisfied:

the amount of reinforcing inorganic filler is greater than 70 phr;
the amount of coupling agent is between 4 and 12 phr;
the amount of bismaleimide compound is between 5 and 10 phr;
the maximum thermomechanical kneading temperature is between 145° C. and 180° C.;
the reinforcing inorganic filler is a siliceous or aluminous filler;
the amount of carbon black is less than 20 phr, preferably between 2 and 15 phr;
the at least bifunctional coupling agent is an organosilane or a polyorganosiloxane;
the bismaleimide compound is N,N'-(m-phenylene)-bismaleimide or N,N'-(4,4'-di-phenyl-methane)-bismaleimide;
the diene elastomer is a butadiene/styrene copolymer (SBR), preferably used in a mixture with a polybutadiene;
the reinforcing inorganic filler represents more than 80% by weight of the total reinforcing filler.

More preferably, in this process, at least one, even more preferably all, of the following characteriztics are satisfied:

the amount of inorganic filler lies within a range from 80 to 110 phr;
the amount of coupling agent is between 3 and 8 phr;
the reinforcing inorganic filler is silica;
the amount of carbon black is less than 15 phr, preferably between 4 and 12 phr;
the coupling agent is an organosilane;
the bismaleimide compound is N,N'-(4,4'-diphenylmethane)bismaleimide;
the diene elastomer is an SBR prepared in solution used in a mixture with a polybutadiene having more than 90% (mol) cis-1,4 bonds;
the reinforcing inorganic filler represents more than 90% by weight of the total reinforcing filler.

Of course, the invention relates to the treads previously described, both in the uncured state (i.e. before curing) and in the cured state (i.e. after cross-linking or vulcanization).

II-7. Properties of the Treads

It can easily be confirmed that the use of a large amount (more than 60 or more than 70 phr) of reinforcing filler, whatever the type of filler used (carbon black or inorganic filler), in combination with more than 4 phr of bismaleimide compound such as DPBM is accompanied, after curing of the compositions, by a great increase in the moduli at low deformation (the values of ME10 possibly being, for example, doubled) and an increase in the Shore A hardness (increased for example by 10 to 20%).

Such an increase in rigidity, which was expected, admittedly allowed the person skilled in the art to predict, for tires mounted on automobiles the treads of which were constituted by such compositions, an improvement in road behavior owing to increased stiffening and therefore increased drift thrust, but also and above all an extremely disadvantageous drop in the grip performance on wet, snow-covered or icy ground.

Such a drop in the grip performance was in fact observed for comparable treads filled with carbon black, but not in the case of treads according to the invention; the latter, surprisingly, benefit from the improved road behavior without adversely affecting the grip performance above.

It must of necessity be deduced from this that the resin lattice provided by the bismaleimide compound, in the rubber compositions of the treads, is "expressed" differently depending on whether these compositions are filled conventionally with carbon black, or on the contrary with a reinforcing inorganic filler such as silica, in the high amounts advocated.

Complementary tests have revealed an unexpected property for the treads according to the invention, which a posteriori explains the above differences in behavior.

These treads, owing to an unexpected phenomenon of auto-accommodation after rolling, have a greatly marked rigidity gradient in the radial direction, this rigidity increasing radially from the surface towards the inside of the tread in a continuous profile, over the entire thickness of the tread or at the very least of the portion of hybrid tread, if applicable, comprising the composition reinforced with inorganic filler and bismaleimide according to the invention. Such a characteristic does not exist in the case of a control tread reinforced with carbon black and the bismaleimide compound.

From all the above results, it may be thought that the stiffening three-dimensional lattice formed by the bismaleimide compound has lesser solidity in the case of the tread filled with silica than in the case of the conventional tread filled with carbon black. Due to this relative fragility, stresses of low amplitude, typical of those experienced during rolling by the surface part of the tread, would be sufficient to break the surface bismaleimide resin lattice, and thus to make the surface part of the tread more flexible and less rigid, and thus make it recover the excellent grip performance which it has in the absence of bismaleimide. On the other hand, in depth, the lattice resin would be little affected by rolling, all the less so as one penetrates inside this tread, thus guaranteeing the additional rigidity sufficient for improved road behavior (greater drift thrust).

Thus, the tread according to the invention, which is flexible at the surface and rigid in its depth once accommodated (run in), combines the two contradictory demands of road behavior and grip on wet, snow-covered or icy ground.

The rigidity gradient described above is illustrated in particular by a very significant difference in modulus at low deformation, or in Shore hardness, between the radially outermost part of the tread, the part in contact with the ground, and the radially innermost part of this tread (or portion of tread, in the case for example of a hybrid tread) stiffened by the presence of the bismaleimide resin lattice.

After standard running-in of passenger-car tires according to the invention, the secant modulus ME10 (10% elongation) may thus vary advantageously from one to two times as much, between the surface (typically between 2 and 8 MPa, depending on the type of tire) and the radially innermost part (typically between 4 and 16 MPa, depending on the type of tire) of the tread.

Comparative Shore hardness measurements carried out on the surface of treads whether or not in accordance with the invention typically yield the following results:

Carbon black filler:

| | |
|---|---|
| without bismaleimide, new tire: | between 60 and 70 points; |
| with bismaleimide (6 phr), new tire: | between 70 and 80 points; |
| with bismaleimide (6 phr), after standard running-in: | between 70 and 80 points. |

Silica filler:

| | |
|---|---|
| without bismaleimide, new tire: | between 60 and 70 points; |
| with bismaleimide (6 phr), new tire: | between 70 and 80 points; |
| with bismaleimide (6 phr), after standard running-in: | between 60 and 70 points. |

The conventional tire, the tread of which is reinforced with carbon black and bismaleimide retains its surface rigidity after running-in, whereas the tire according to the invention, the tread of which is reinforced with silica and bismaleimide recovers its range of initial hardness after running-in, which confirms the changes in moduli ME10 commented on previously.

The invention thus unexpectedly makes it possible to modulate the differences in rigidity between the surface of a tread and its radially inner part, and therefore to adjust the desired compromise of grip/road behavior.

It is henceforth possible to produce tires of low rolling resistance the tread of which (at the very least for the portion of tread comprising the bismaleimide compound in the case for example of a hybrid tread of the "cap-base" type) has a modulus which increases radially in a continuous profile, which is low at the surface (for example between 2 and 8 MPa in the case of a passenger-car tire), and high in the depth (for example between 8 and 16 MPa in its radially innermost part, for this same passenger-car tire).

Preferably, in the case of a conventional passenger-car tire (summer), the modulus ME10 will thus be between 5 and 8 MPa (in particular between 5.5 and 7.5 MPa) at the surface and between 8 and 14 MPa (in particular between 9 and 13 MPa) in the depth (radially innermost part). Preferably, in the case of a "winter" tire intended for snow-covered or icy roads, the modulus ME10 will be between 3 and 6 MPa at the surface (in particular between 3.5 and 5.5 MPa), and between 6 and 12 MPa (in particular between 7 and 11 MPa) in the depth.

III. EXAMPLE OF EMBODIMENT

III-1. Preparation of the Rubber Compositions and Treads

For the following tests, the procedure is as follows: the reinforcing filler, the coupling agent, the diene elastomer or the mixture of diene elastomers, the bismaleimide compound and the various other ingredients, with the exception of the vulcanization system, are introduced in succession into an internal mixer filled to 70% of capacity, the initial tank temperature of which is approximately 60° C. Thermomechanical working (non-productive phase) is then performed in one stage, of a duration of about 3 to 4 minutes in total, until a maximum "dropping" temperature of 165° C. is obtained. The mixture thus obtained is recovered, it is cooled and then sulphur and sulphenamide accelerator are incorporated on an external mixer (homo-finisher) at 30° C., by mixing everything (productive phase) for an appropriate time, of between 5 and 12 minutes.

The compositions thus obtained are then calendered either in the form of plates (thickness of 2 to 3 mm) or of thin sheets of rubber in order to measure their physical or mechanical properties, or extruded in the form of treads for radial-carcass passenger-car tires (dimensions 195/65 R15—speed index H).

III-2. Tests

In this test, 7 rubber compositions are compared, based on known SBR and BR diene elastomers, reinforced by carbon black or silica, usable as treads for summer tires for passenger vehicles.

These compositions C-1 to C-7 are distinguished essentially by the following characteristics:

C-1: reinforced by 70 phr of carbon black, without bismaleimide;

C-2: reinforced by 70 phr of carbon black+6 phr of bismaleimide;

C-3: reinforced by 80 phr of silica, without bismaleimide;

C-4: reinforced by 80 phr of silica+6 phr of bismaleimide;

C-5: reinforced by 80 phr of silica+8 phr of bismaleimide;

C-6: reinforced by 80 phr of silica+2 phr of bismaleimide;

C-7: reinforced by 60 phr of silica+2 phr of bismaleimide.

The compositions C-1 and C-3 constitute the references "black" and "silica" of this test. Their respective formulations were adjusted so as to bring them both to initial iso-rigidity (Shore A hardness), before incorporation of bismaleimide.

The compositions C-3 to C-7 furthermore contain the coupling agent TESPT (amount of 8% by weight relative to the quantity of silica) and the DPG (approximately 2.6% by weight relative to the quantity of silica). In these compositions C-3 to C-7, the carbon black is present in a very small amount (6 phr), essentially used as a black pigmentation agent.

Only the treads comprising the compositions C-4 and C-5 are therefore in accordance with the invention. The compositions C-6 and C-7 are not in accordance with the invention because they comprise an insufficient amount of bismaleimide, whatever the amount of reinforcing inorganic filler (60 or 80 phr).

Tables 1 and 2 show the formulation of the different compositions (Table 1—amounts of the different products expressed in phr), and their properties after curing (40 min at 150° C.).

A comparison, first of all, of the control compositions C-1 and C-3 (devoid of bismaleimide) demonstrates that after curing they have an equivalent rigidity (Shore A hardnesses identical; values of modulus at low deformation ME10 very close) and identical reinforcement properties (identical moduli at high deformations—ME100 and ME300).

After incorporation of bismaleimide in a sufficient quantity (6 or 8 phr), for both types of compositions (compare C-2 to C-1 on one hand, C-4 and C-5 to C-3 on the other hand) a great rise is observed in the value of modulus at low deformation (values ME10 practically doubled) and in the Shore hardness (increased by 10 to 20%).

This stiffening may be described as expected, as explained previously.

However, one significant difference must be noted between compositions C-2 on one hand and C-4 or C-5 on the other hand, this difference relating to the evolution of the modulus ($ME10_{Ac.}$) at low deformation, after mechanical accommodation (15%).

In the case of the control composition C-2 (carbon black filler), it will be noted that the modulus $ME10_{Ac.}$ remains very high after accommodation (9.1 MPa compared with an initial 5.5 MPa for composition C-1, or approximately 65% greater); on the contrary, this same modulus $ME10_{Ac.}$ drops very greatly (from 11-12 MPa to 7-7.5 MPa) for compositions C-4 and C-5 (silica filler), recovering practically the initial value ME10 (6.0 MPa) recorded for the control composition C-3 devoid of bismaleimide. The ratios ($ME10_{Ac.}$/ME10) of Table 2, expressed in %, clearly express this difference in behavior between the compositions C-2 and C-4 or C-5.

These results show that the bismaleimide lattice is therefore "expressed" differently, and has a different solidity depending on whether the compositions are filled with carbon black, or with a reinforcing inorganic filler such as silica, in the high amounts advocated.

As for the other compositions not in accordance with the invention C-6 and C-7, comprising a lesser (insufficient) amount of bismaleimide (2 phr), it will be noted that the gain in rigidity is too low or non-existent (see modulus ME10 and Shore hardness).

The rubber compositions previously described, based on diene elastomer, reinforcing inorganic filler, a coupling agent and a bismaleimide compound, in the proportions indicated above, may advantageously constitute the entire tread according to the invention.

However, the invention also applies to those cases in which these rubber compositions comprising the bismaleimide compound form only part of a composite tread such as described for example in the introduction to the present specification, formed of at least two radially superposed layers of different rigidity (so-called "cap-base" structure), both intended to come into contact with the road during rolling of the tire, during the life of the latter. The part comprising the bismaleimide compound may then constitute the radially outer layer of the tread intended to come into contact with the ground from the start of rolling of the new tire, or on the contrary its radially inner layer intended to come into contact with the ground later on, in the event that it is for example desired to "delay" the technical effect of auto-accommodation provided by the invention.

Due to the treads according to the invention and to the specific formulation of their rubber compositions, it is henceforth possible to "reconcile" grip on wet ground and road behaviour, without using solutions which are complex, costly or non-durable such as described in the introduction to the present specification.

The treads according to the invention offer the major advantage, compared in particular with the composite treads of the prior art, on one hand of maintaining their compromise of performances throughout the life of the tire, due to the unexpected phenomenon of auto-accommodation which is observed, and on the other hand of having a true radial rigidity gradient, and not a simple, very localized, "accident" of rigidity. This true rigidity gradient results in optimum "working" of the blocks of rubber in contact with the ground, during rolling and the numerous forces transmitted to the tread, in other words is synonymous with a tire which grips the road even better.

This result may be obtained while maintaining the performances of rolling resistance and wear resistance at the high levels which one is entitled to expect nowadays from rubber compositions based on reinforcing inorganic fillers such as highly dispersible silicas.

The invention finds a very advantageous application in tires fitted on vehicles such as motorcycles, passenger cars, vans or heavy vehicles, in particular in high-grip tires of the "snow" or "ice" type (also referred to as "winter" tires) which, owing to a deliberately more flexible tread, could have lower-performance road behaviour on dry ground.

TABLE 1

| Composition No.: | C-1 | C-2 | C-3 | C-4 | C-5 | C-6 | C-7 |
|---|---|---|---|---|---|---|---|
| SBR (1) | 70 | 70 | 70 | 70 | 70 | 70 | 70 |
| BR (2) | 30 | 30 | 30 | 30 | 30 | 30 | 30 |
| carbon black (3) | 70 | 70 | 6 | 6 | 6 | 6 | 6 |
| silica (4) | — | — | 80 | 80 | 80 | 80 | 60 |
| coupling agent (5) | — | — | 6.4 | 6.4 | 6.4 | 6.4 | 6.4 |
| MPBM (6) | — | 6 | — | 6 | 8 | 2 | 2 |
| oil (7) | 20 | 20 | 39 | 39 | 39 | 39 | 39 |
| DPG (8) | — | — | 2.1 | 2.1 | 2.1 | 2.1 | 2.1 |
| ZnO | 2.5 | 2.5 | 2.5 | 2.5 | 2.5 | 2.5 | 2.5 |
| stearic acid | 2 | 2 | 2 | 2 | 2 | 2 | 2 |
| antioxidant (9) | 1.9 | 1.9 | 1.9 | 1.9 | 1.9 | 1.9 | 1.9 |
| sulphur | 1.5 | 1.5 | 1.5 | 1.5 | 1.5 | 1.5 | 1.5 |
| accelerator (11) | 1.5 | 1.5 | 1.5 | 1.5 | 1.5 | 1.5 | 1.5 |

(1) SBR (expressed in dry SBR) extended with 37.5% by weight (26.25 phr) of oil (or a total of 96.25 phr of extended SBR); 26.5% styrene, 59.5% 1,2-polybutadiene units and 23% trans-1,4-polybutadiene units (Tg = −29° C.);
(2) BR with 4.3% of 1, 2; 2.7% of trans; 93% of cis 1, 4 (Tg = −106° C.);
(3) carbon black N234;
(4) silica "Zeosil 1165 MP" from Rhodia, type "HDS" (BET and CTAB: approximately 160 m²/g);
(5) TESPT coupling agent ("Si69" from Degussa);
(6) N,N'-(m-phenylene)-bismaleimide ("HVA2"- from Du Pont de Nemours);
(7) total aromatic oil (including extender oil for the SBR);
(8) diphenylguanidine (Perkacit DPG from Flexsys);
(9) N-1,3-dimethylbutyl-N-phenylparaphenylenediamine (Santoflex 6-PPD from Flexsys);
(10) HMT (from Degussa);
(11) N-cyclohexyl-2-benzothiazyl sulphenamide (Santocure CBS from Flexsys).

TABLE 2

| Composition No. | C-1 | C-2 | C-3 | C-4 | C-5 | C-6 | C-7 |
|---|---|---|---|---|---|---|---|
| Shore A | 65 | 73 | 66 | 73 | 77 | 69 | 66 |
| Shore A (r. u.) | 100 | 112 | 100 | 111 | 117 | 105 | 100 |
| ME10 (MPa) | 5.5 | 11.8 | 6.0 | 12.0 | 11.5 | 7.0 | 5.9 |
| ME10 (r. u.) | 100 | 210 | 100 | 200 | 190 | 120 | 100 |

TABLE 2-continued

| Composition No. | C-1 | C-2 | C-3 | C-4 | C-5 | C-6 | C-7 |
|---|---|---|---|---|---|---|---|
| ME100 (MPa) | 1.85 | 2.3 | 1.9 | 2.2 | 2.4 | 2.1 | 1.8 |
| ME300 (MPa) | 2.2 | 2.0 | 2.15 | 1.6 | 2.1 | 2.1 | 1.8 |
| ME10$_{Ac.}$ | 4.4 | 9.1 | 4.8 | 7.2 | 7.4 | — | — |
| ME10$_{Ac.}$/ME10 | 80% | 79% | 80% | 60% | 64% | — | — |

(r. u. relative units)

What is claimed is:

1. A tire comprising a tread, wherein said tread includes a rubber composition comprising:
   (i) a diene elastomer;
   (ii) more than 60 phr of a reinforcing inorganic filler;
   (iii) between 2 and 15 phr of a coupling agent;
   (iv) from 5 to 10 phr of a bismaleimide compound; and
   (v) less than 20 phr of a carbon black;
wherein the reinforcing inorganic filler is silica.

2. The tire according to claim 1, wherein the diene elastomer is selected from the group which consists of polybutadienes, synthetic polyisoprenes, natural rubber, butadiene copolymers, isoprene copolymers and mixtures of these elastomers.

3. The tire tread-according to claim 1, wherein the quantity of reinforcing inorganic filler is greater than 70 phr.

4. The tire according to claim 3, wherein the quantity of reinforcing inorganic filler is between 70 and 120 phr.

5. The tire according to claim 1, wherein the bismaleimide compound is N,N'-(m-phenylene)-bismaleimide or N,N'-(4,4'-diphenylmethane)-bismaleimide.

6. The tire according to claim 5, wherein the bismaleimide compound is N,N'-(4,4'-diphenylmethane)-bismaleimide.

7. The tire according claim 1, wherein the diene elastomer is a butadiene/styrene copolymer (SBR).

8. The tire according to claim 7, wherein the SBR elastomer has a styrene content between 20% and 30% by weight, a content of vinyl bonds of the butadiene fraction between 15% and 65%, a content of trans-1,4 bonds between 20% and 75% and a glass transition temperature between −20° C. and −55° C.

9. The tire according to claim 7, wherein the rubber composition further comprises a polybutadiene having more than 90% cis-1,4 bonds.

10. The tire according to claim 1, wherein the amount of carbon black is between 2 and 15 phr.

11. The tire according to claim 1, wherein said tread comprises at least two different, radially superposed, rubber compositions, the rubber composition comprising the bismaleimide compound forming the radially outer part of this tread.

12. The tire according to claim 1, wherein said tread comprises at least two different, radially superposed, rubber compositions, the rubber composition comprising the bismaleimide compound forming the radially inner part of this tread.

13. The tire according to claim 1, wherein said tread is in the vulcanized state.

14. A process for preparing a tire tread having, after curing and mechanical running-in of the tire comprising it, a rigidity gradient which increases radially from the surface towards the inside of the tread, wherein said process comprises the following steps:
   incorporating in a diene elastomer, in a mixer, during a first step referred to as "non-productive":
      more than 60 phr of a reinforcing inorganic filler;
      between 2 and 15 phr of a coupling agent;
      from 5 to 10 phr of a bismaleimide compound, by thermomechanically kneading the entire mixture, in one or more stages, until a maximum temperature of between 130° C. and 200° C. is reached;
   cooling the entire mixture to a temperature of less than 100° C.;
   then incorporating, during a second step referred to as "productive":
      a vulcanization system;
   kneading the entire mixture until a maximum temperature less than 120° C. is reached; and
   extruding or calendering the rubber composition thus obtained, in the form of a tire tread; wherein the reinforcing inorganic filler is silica.

15. The process according to claim 14, wherein the diene elastomer is selected from among the group consisting of polybutadienes, synthetic polyisoprenes, natural rubber, butadiene copolymers, isoprene copolymers and mixtures of these elastomers.

16. The process according to claim 14, wherein the quantity of reinforcing inorganic filler is greater than 70 phr.

17. The process according to claim 16, wherein the quantity of reinforcing inorganic filler is of between 70 and 120 phr.

18. The process according to claim 14, wherein the bismaleimide compound is N,N'-(m-phenylene)-bismaleimide or N,N'-(4,4'-diphenylmethane)-bismaleimide.

19. The process according to claim 18, wherein the bismaleimide compound is N,N'-(4,4'-diphenylmethane)-bismaleimide.

20. The tire according to claim 1, wherein the tire is a passenger-car tire, wherein the tread of said tire has, after vulcanization and mechanial running-in of the tire, a rigidity gradient which increases radially from the surface towards the inside of the tread, the modulus ME10 (secant modulus at 10% elongation) of said tread being between 2 and 8 MPa at the surface of said tread, and between 8 and 16 MPa in the radially innermost part of said tread.

21. The tire according to claim 20, wherein the tire is a summer passenger-car tire, the modulus ME10 of the tread being between 5 and 8 MPa at the surface of said tread, and between 8 and 14 MPa in the radially innermost part of said tread.

22. The tire according to claim 20, wherein the tire is a winter passenger-car tire, the modulus ME10 of the tread being between 3 and 6 MPa at the surface of said tread, and between 6 and 12 MPa in the radially innermost part of said tread.

* * * * *